United States Patent
Horn et al.

(10) Patent No.: US 8,442,060 B2
(45) Date of Patent: May 14, 2013

(54) METHOD AND APPARATUS FOR PROVIDING SIGNALING ACCESS

(75) Inventors: Gavin B. Horn, La Jolla, CA (US);
Avneesh Agrawal, San Diego, CA (US);
Ashwin Sampath, Princeton, NJ (US);
Alexei Gorokhov, San Diego, CA (US);
Naga Bhushan, San Diego, CA (US);
Rajarshi Gupta, Santa Clara, CA (US);
Fatih Ulupinar, San Diego, CA (US);
Parag A. Agashe, San Diego, CA (US);
Rajat Prakash, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 1296 days.

(21) Appl. No.: 12/198,829

(22) Filed: Aug. 26, 2008

(65) Prior Publication Data
US 2009/0196221 A1 Aug. 6, 2009

Related U.S. Application Data

(60) Provisional application No. 61/025,186, filed on Jan. 31, 2008, provisional application No. 61/025,680, filed on Feb. 1, 2008.

(51) Int. Cl.
*H04L 12/28* (2006.01)
(52) U.S. Cl.
USPC ............ 370/401; 370/252; 370/338; 370/231
(58) Field of Classification Search ................... 370/252, 370/329, 331, 338, 401
See application file for complete search history.

(56) References Cited

U.S. PATENT DOCUMENTS

| | | | |
|---|---|---|---|
| 5,392,449 A | 2/1995 | Shaughnessy et al. | |
| 5,915,219 A | 6/1999 | Poyhonen | |
| 6,643,517 B1 | 11/2003 | Steer | |
| 7,089,585 B1 * | 8/2006 | Dharmarajan | 726/8 |
| 7,447,765 B2 | 11/2008 | Aerrabotu et al. | |
| 2002/0090975 A1 | 7/2002 | Laiho et al. | |
| 2003/0017822 A1 | 1/2003 | Kissner et al. | |

(Continued)

FOREIGN PATENT DOCUMENTS

| | | |
|---|---|---|
| CN | 1422507 A | 6/2003 |
| CN | 1502200 A | 6/2004 |

(Continued)

OTHER PUBLICATIONS

International Search Report, PCT/US2008/074754, International Search Authority, European Patent Office, Feb. 17, 2009.

(Continued)

*Primary Examiner* — Duc C Ho
(74) *Attorney, Agent, or Firm* — Stanton Braden

(57) ABSTRACT

Signaling-only access may be established with an access node under certain circumstances such as, for example, upon determining that a node is not authorized for data access at the access node. A node that is not authorized for data access at an access node may still be paged by the access node through the use of signaling-only access. In this way, transmissions by the access node may not interfere with the reception of pages at the node. A first node may be selected for providing paging while a second node is selected for access under certain circumstances such as, for example, upon determining that the second node provides more desirable service than the first node.

108 Claims, 10 Drawing Sheets

U.S. PATENT DOCUMENTS

| | | |
|---|---|---|
| 2003/0171112 A1 | 9/2003 | Lupper et al. |
| 2004/0248574 A1 | 12/2004 | Watanabe et al. |
| 2005/0256870 A1 | 11/2005 | Benco et al. |
| 2006/0198347 A1 | 9/2006 | Hurtta et al. |
| 2007/0270152 A1 | 11/2007 | Nylander et al. |
| 2009/0086672 A1* | 4/2009 | Gholmieh et al. ............ 370/329 |
| 2009/0197570 A1 | 8/2009 | Horn et al. |
| 2009/0288140 A1* | 11/2009 | Huber et al. ...................... 726/2 |
| 2012/0044908 A1* | 2/2012 | Spinelli et al. ................ 370/331 |

FOREIGN PATENT DOCUMENTS

| | | |
|---|---|---|
| EP | 1475986 | 11/2004 |
| JP | 2003319443 | 11/2003 |
| JP | 2004507973 A | 3/2004 |
| JP | 2004242139 A | 8/2004 |
| JP | 2004336384 A | 11/2004 |
| JP | 2005051436 A | 2/2005 |
| KR | 20050122241 A | 12/2005 |
| RU | 2005130160 A | 6/2006 |
| WO | WO2004077864 A1 | 9/2004 |
| WO | 2004091246 | 10/2004 |
| WO | WO2004095232 A2 | 11/2004 |
| WO | WO2006057210 A1 | 6/2006 |
| WO | WO2007021951 A2 | 2/2007 |
| WO | WO2007136339 | 11/2007 |
| WO | WO2008008990 | 1/2008 |

OTHER PUBLICATIONS

Written Opinion, PCT/US2008/074754, International Search Authority, European Patent Office, Feb. 17, 2009.
International Search Report, PCT/US2008/075233, International Search Authority, European Patent Office, Feb. 18, 2009.
Written Opinion, PCT/US2008/075233, International Search Authority, European Patent Office, Feb. 18, 2009.
Taiwan Search Report—TW097135363—TIPO—Feb. 2, 2012.

* cited by examiner

METHOD AND APPARATUS FOR PROVIDING SIGNALING ACCESS

CLAIM OF PRIORITY UNDER 35 U.S.C. §119

This application claims the benefit of and priority to commonly owned U.S. Provisional Patent Application No. 61/025,186, filed Jan. 31, 2008, and U.S. Provisional Patent Application No. 61/025,680, filed Feb. 1, 2008, the disclosure of each of which is hereby incorporated by reference herein.

CROSS-REFERENCE TO RELATED APPLICATION

This application is related to concurrently filed and commonly owned U.S. patent application Ser. No. 12/198,833, filed on Aug. 26, 2008, entitled "PAGING AND ACCESS VIA DIFFERENT NODES," the disclosure of which is hereby incorporated by reference herein.

BACKGROUND

1. Field

This application relates generally to wireless communication and more specifically, but not exclusively, to improving communication performance.

2. Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement the base stations of a conventional mobile phone network (e.g., a macro cellular network), small-coverage base stations may be deployed, for example, in a user's home. Such small-coverage base stations are generally known as access point base stations, home NodeBs (or home eNodeBs), or femto cells and may be used to provide more robust indoor wireless coverage to mobile units. Typically, such small-coverage base stations are connected to the Internet and the mobile operator's network via a DSL router or a cable modem.

In a typical macro cellular deployment the radio frequency ("RF") coverage is planned and managed by cellular network operators to optimize coverage. In such a deployment, an access terminal generally will connect to the best base station it hears for service. Here, RF planning may be employed in an attempt to ensure that the signal a given access terminal receives from a serving base station is sufficiently higher than the signals the access terminal receives from any interfering base stations, thereby enabling the access terminal to receive adequate service. An access terminal that sees interference levels that are too high may be defined to be in outage.

In contrast, deployment of small-coverage base stations may be ad-hoc RF and coverage of these base stations may not be optimized by the mobile operator. Consequently, RF interference issues may arise. For example, a mobile unit that is not authorized to access a nearby base station (e.g., a femto cell) may be subjected to interference from that base station. Thus, there is a need for improved network interference management for wireless networks.

SUMMARY

A summary of sample aspects of the disclosure follows. It should be understood that any reference to the term aspects herein may refer to one or more aspects of the disclosure.

The disclosure relates in some aspect to establishing signaling-only access to and/or from an access node. For example, signaling-only access (e.g., a signaling only route) may be established from a first node (e.g., an access point) to a second node (e.g., an access terminal) if it is determined that the second node is not authorized to access the first node (e.g., not authorized to establish calls or sessions).

In some aspects, signaling may be employed to manage interference from a restricted access point. For example, an access terminal and a restricted access point may exchange control messages to manage interference transmissions (e.g., by orthogonalizing transmission through the use of different timeslots or interlaces in a timeline).

The disclosure relates in some aspects to paging a node that is not authorized for access (e.g., data access). For example, when a node identifies a restricted access node that it is not authorized to access, the node may send a message that will cause the node to be paged by the restricted access node. In some cases, the restricted access node may allow limited signaling access for the node that will result in the node being paged by the restricted access node. For example, the node may be allowed to register at the restricted access node. In this case, the restricted access node will page the node as a result of the registration. In another case, the node may be allowed to send some other type of message to the restricted access node that enables services including paging. Thus, the transmission of such a message by the node may result in the node being paged by the restricted access node. Alternatively, the node may send a message to another node (e.g., an access node that is not restricted for access) where the message indicates that the node wishes to be paged by the restricted access node. The other node may then forward this message (or send another form of message) to an entity (e.g., a mobility manager) that controls paging in the network. This entity may then instruct the restricted access node to page the node at the designated paging times. By allowing the node to be paged by the restricted access node, potential interference from the restricted access node during the node's designated paging times may be eliminated because the restricted access node will no longer transmit other types of signals that could potentially interfere with the node's reception of its pages at those paging times.

The disclosure relates in some aspects to selecting a first node for providing paging and selecting another node to access. For example, the first node may be selected for paging if it is associated with better geometry than the second node. In addition, the second node may be selected for access if it provides better or different service than the first node.

BRIEF DESCRIPTION OF THE DRAWINGS

These and other sample aspects of the disclosure will be described in the detailed description and the appended claims that follow, and in the accompanying drawings, wherein:

Figure 1:
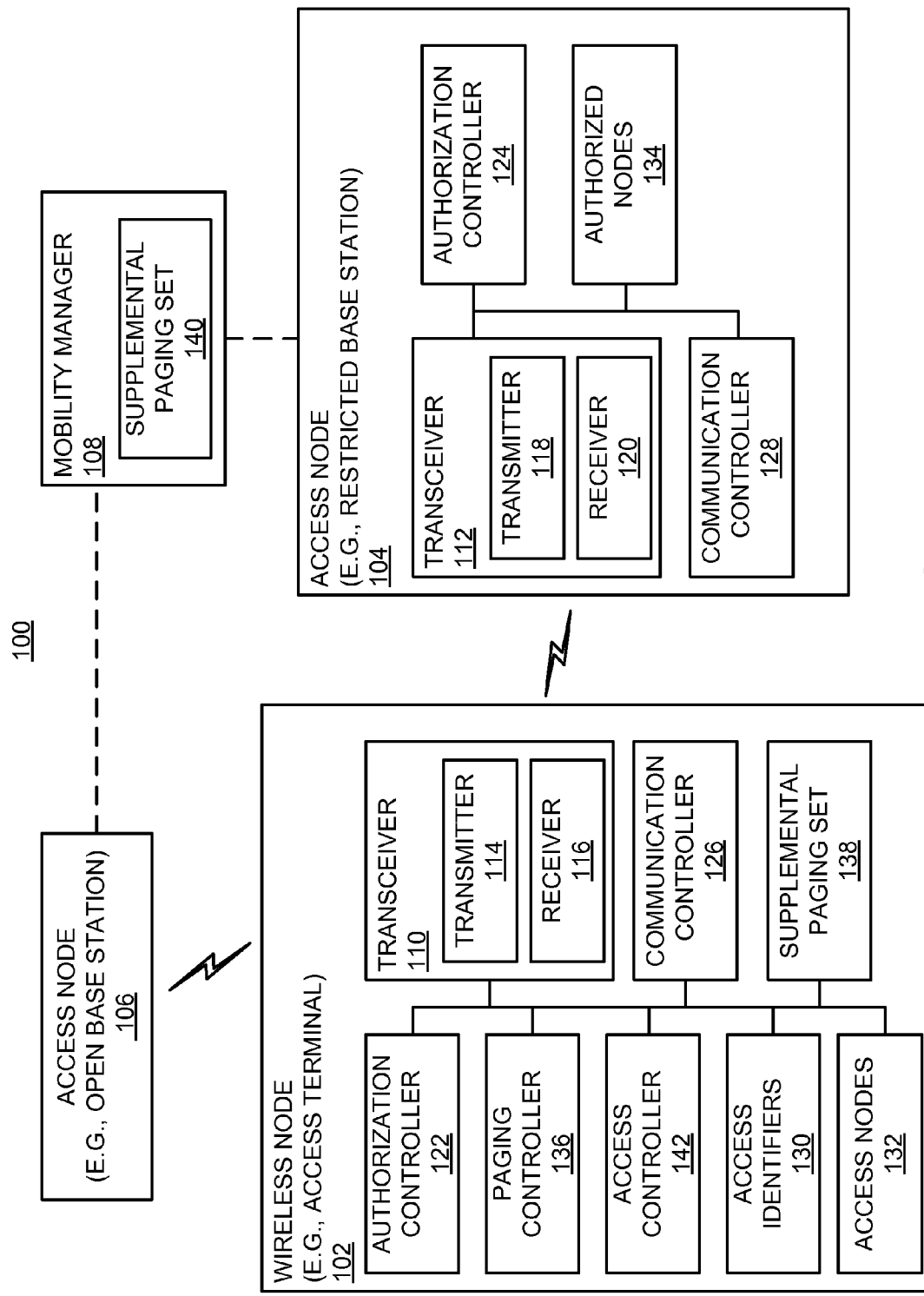
FIG. 1 is a simplified block diagram of several sample aspects of a communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates sample aspects of a system 100 where a wireless node 102 (e.g., an access terminal) is near an access node 104 (e.g., a base station) and an access node 106 (e.g., a base station). Under certain circumstances, the wireless node 102 may communicate with the access node 104 in one manner and communicate with the access node 106 in another manner.

The wireless node 102 may determine how to communicate with the nodes 104 and 106 based on various criteria. For example, the wireless node 102 may elect to receive pages from one of the nodes 104 and 106 based on the relative geometries associated with the nodes 104 and 106. Conversely, the wireless node 102 may elect to obtain data access through the other node based on the relative services provided by the nodes 104 and 106.

An access node such as the access node 104 may be restricted whereby only certain access terminals (e.g., not wireless node 102) are allowed data access to the access node 104, or the access node 104 may be restricted in some other manner. In such a case, to mitigate potential interference between the nodes 102 and 104, a signaling-only link may be established between these nodes. For example, a mobility manager 108 may cause the access node 104 to page the wireless node 102 while the wireless node 102 may obtain network access via the access node 106. As another example, the nodes 102 and 104 may establish a signaling-only link to exchange messages to control their respective transmissions (e.g., by orthogonalizing the transmissions) to reduce inter-node interference.

FIG. 1 illustrates several sample components that may be incorporated into the wireless node 102 and the access node 104 in accordance with the teachings herein. It should be appreciated that similar components may be incorporated into other nodes in the system (e.g., the node 106). The wireless node 102 and the access node 104 include transceivers 110 and 112, respectively, for communicating with each other and with other nodes. The transceiver 110 includes a transmitter 114 for sending signals and a receiver 116 for receiving signals. The transceiver 112 includes a transmitter 118 for transmitting signals and a receiver 120 for receiving signals. The nodes 102 and 104 may include authorization controllers 122 and 124, respectively, for managing access to other nodes and for providing other related functionality as taught herein. The nodes 102 and 104 also may include communication controllers 126 and 128, respectively, for managing communications with other nodes and for providing other related functionality as taught herein. The other components illustrated in FIG. 1 will be discussed in the disclosure that follows.

Figure 2:
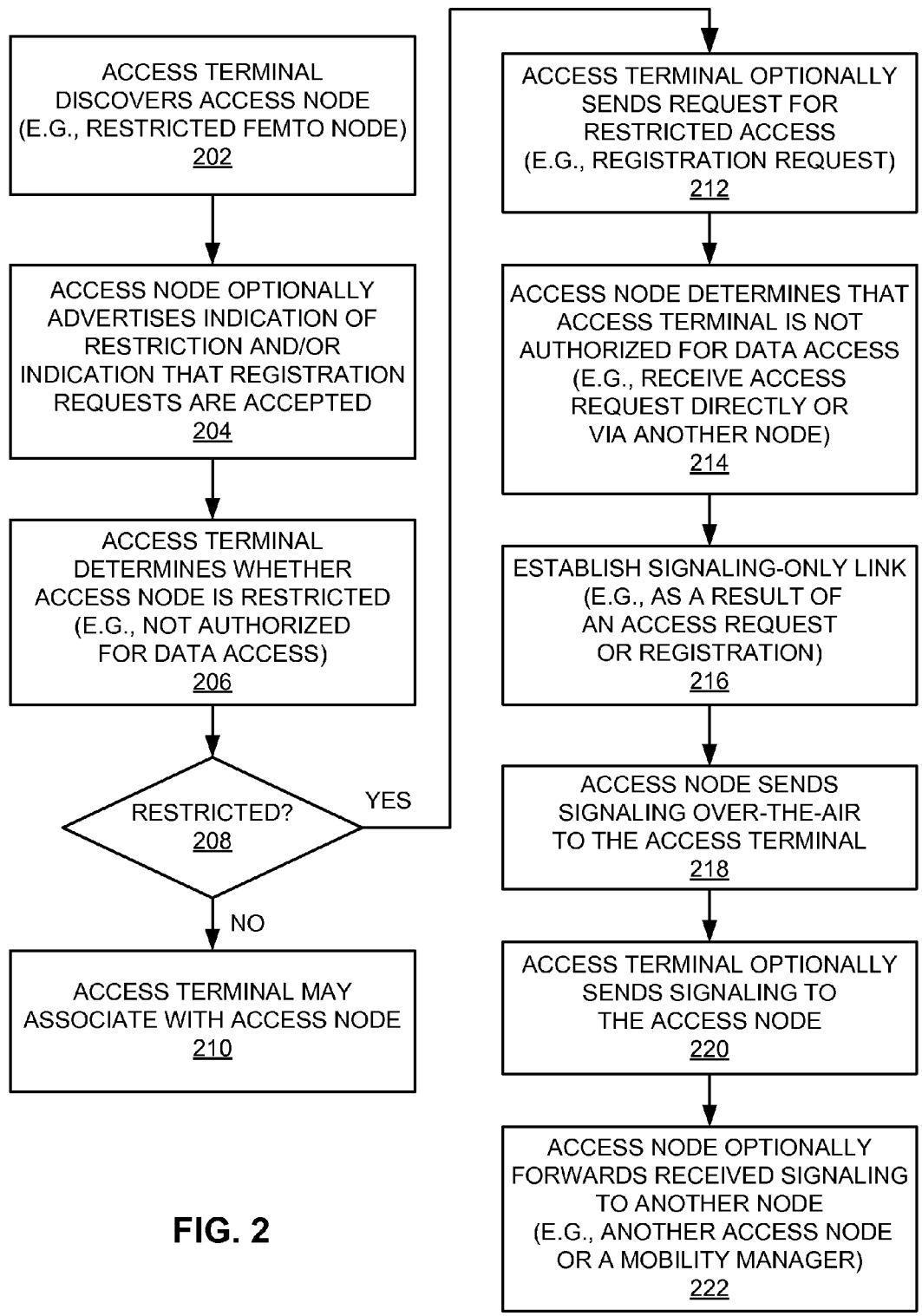
FIG. 2 is a flowchart of several sample aspects of operations that may be performed to establish a signaling-only link.
Figure 3:
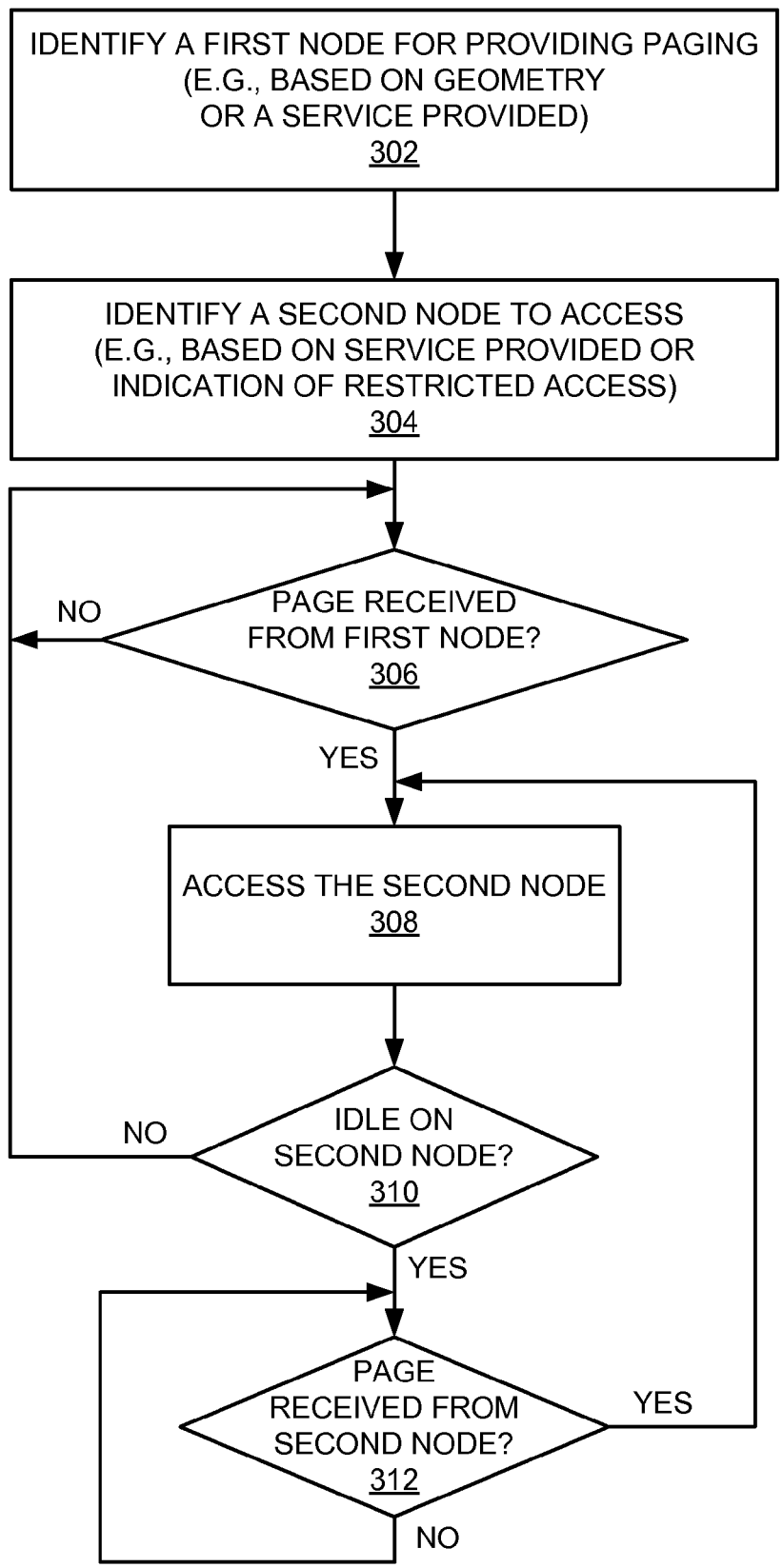
FIG. 3 is a flowchart of several sample aspects of operations that may be performed to identify different nodes for paging and access.
Figure 5:
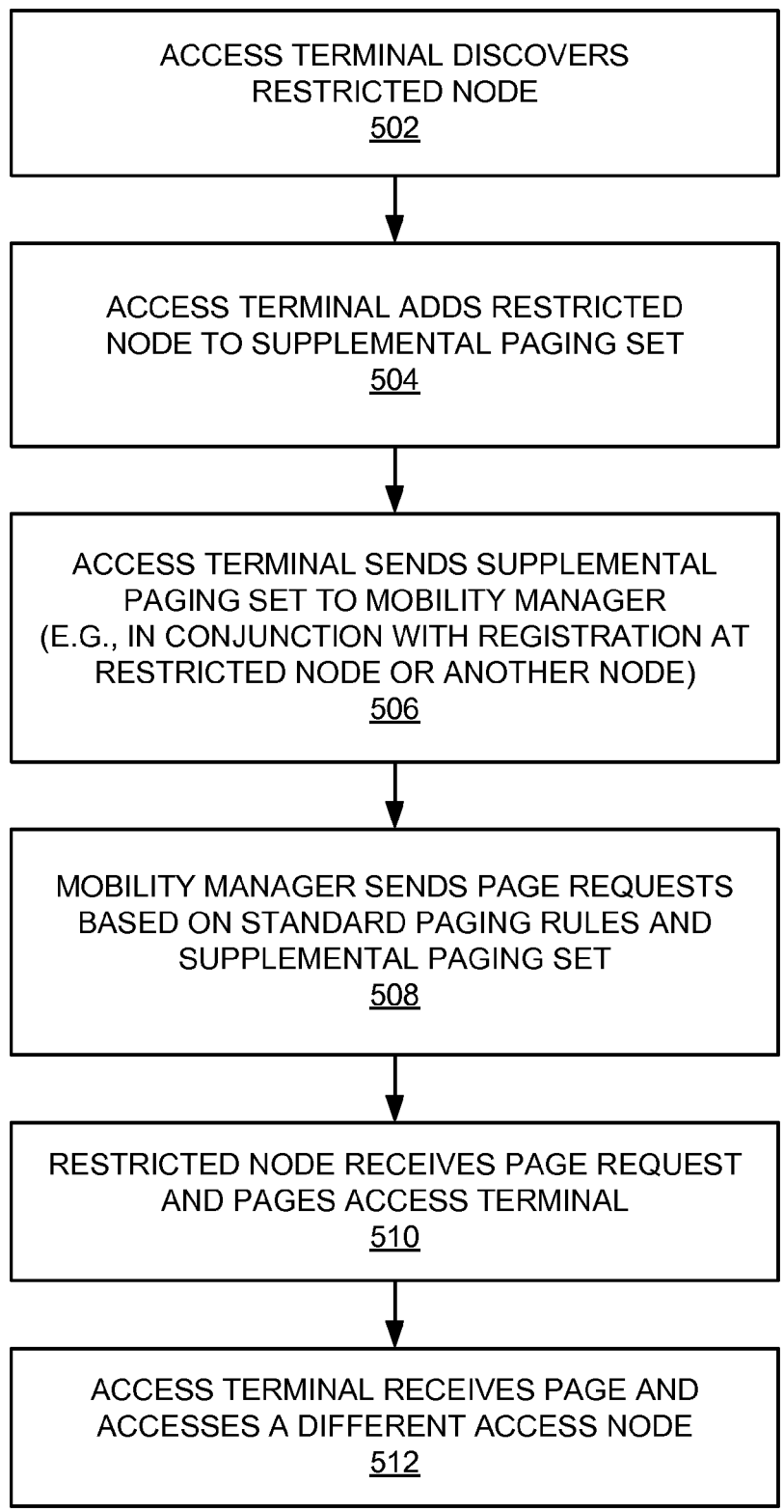
FIG. 5 is a flowchart of several sample aspects of operations that may be performed to enable a node to be paged by a restricted node.

Sample operations of a system such as the system 100 will now be treated in more detail in conjunction with the flowcharts of FIGS. 2, 3 and 5. Briefly, FIG. 2 describes several operations that may be employed in conjunction with establishing a signaling-only link between wireless nodes. FIG. 3 describes several operations that may be employed in conjunction with receiving paging from one node while accessing another node. FIG. 5 describes several operations that may be employed in conjunction with using a supplemental paging set to receive pages from a restricted node.

For convenience, the operations of FIGS. 2, 3, and 5 (or any other operations discussed or taught herein) may be described as being performed by specific components (e.g., components of the system 100). It should be appreciated, however, that these operations may be performed by other types of components and may be performed using a different number of components. It also should be appreciated that one or more of the operations described herein may not be employed in a given implementation.

For illustration purposes various aspects of the disclosure will be described in the context of an access terminal (e.g., the access terminal 102) that communicates with one or more access nodes (e.g., the access nodes 104 and 106). It should be appreciated, however, that the teachings herein may be applicable to other types of apparatuses or apparatuses that are referred to using other terminology.

Referring initially to FIG. 2, as represented by block 202, at some point in time an access terminal 102 may discover a set of access nodes in a given area of coverage (e.g., a neighborhood). For example, as the access terminal 102 visits a given geographical area, the access terminal 102 may receive signaling on a broadcast channel from the access node 104 or may receive information from another node that indicates the presence of the access node 104. As an example of the latter case, the access terminal 102 may receive a neighbor list from an access node (e.g., the access node 106) that is a neighbor of the access node 104.

As represented by block 204, in some cases the access node 104 may advertise one or more indications relating to one or more restrictions imposed at the access node 104. For example, the access node 104 may transmit (e.g., broadcast) information that indicates that access to the access node 104 is restricted in some manner. As will be discussed in more detail below, one type of restriction is that the access node 104 may provide data access only for a set of designated nodes (e.g., access terminals). In some aspects, the access node 104 may restrict at least one of: signaling (e.g., control messages), data access, registration, paging, or service to at least one node. Hence, in various implementations, the access node 104 may advertise one or more indications relating to these or other types of restrictions.

In addition, if applicable, the access node 104 may transmit information that indicates that the access node 104 may allow some form of signaling with nodes (e.g., access terminals) that are not authorized for data access or some other access at the access node 104. For example, the access node 104 may transmit an indication that it accepts registration requests from a node that is not authorized for data access. In some aspects, the operations of block 204 may be performed by and/or in conjunction with the authorization controller 124 depicted in FIG. 1.

As represented by block 206, the access terminal 102 may determine whether it is authorized for data access at the access node 104. This determination may be based on information received from the access node 104 as discussed at block 204 or other some other information maintained by the access terminal. As an example of the former case, the access terminal 102 may compare a received indication with a list of access identifiers 130 to determine which services are provided by the access node 104 or to determine the existing restrictions. As an example of the latter case, the access terminal 102 may maintain a list 132 including identifiers of access nodes that are open with respect to the access terminal 102 (e.g., a list of home base stations) or are restricted with respect to the access terminal 102 (e.g., a list of closed base stations).

As represented by block 208 and 210, if the access node 104 is not restricted, the access terminal 102 may elect to associate with the access node 104. For example, the access terminal 102 may send an access request (e.g., a registration request) to the access node 104 and commence idling on the access node 104.

In some cases, even if it is determined at block 208 that access by the access terminal 102 is restricted, the access terminal 102 may still elect to idle at the access node 104. For example, the access terminal 102 may elect to idle at the access node 104 if the carrier-to-interference ("C/I") of signals received from the access node 104 is higher than the C/I of signals received from other access nodes. In some aspects, a decision as to whether to idle at the access node 104 may be based on whether the access node 104 authorizes some form of signaling access for the access terminal 102 (e.g., paging). As discussed herein, such signaling may be desirable to mitigate any interference that may be caused by the access terminal 102 idling at the access node 104 in the case where the access terminal 102 is not authorized for data access at the access node 104. In some aspects, the operations of block 206 may be performed by and/or in conjunction with the authorization controller 122 and/or a paging controller 136 of FIG. 1.

As represented by block 212, the access terminal 102 may access the access node 104 for signaling by, for example, sending an access request to create one or more signaling-only links (or routes) to and/or from the access node 104. Such a request may take various forms. For example, in a case where the access node 104 allows a node without data access to register at the access node 104, the access terminal 102 may send a registration request over-the-air to the access node 104.

In other cases the access terminal 102 may send an access request to another network node (e.g., access node 106) with which the access terminal 102 has better access privileges (e.g., data access). For example, the access node 106 may forward the access request to the access node 104 via a backhaul or over-the-air (e.g., via a protocol tunnel). In some cases, in conjunction with the access terminal 102 registering with another node (e.g., the access node 106), the access terminal 102 may send an indication that invokes signaling-only access with the access node 104 (e.g., causes the access node 104 to page the access terminal 102). An example of this latter scenario is discussed in more detail below in conjunction with FIG. 5. In some aspects, the operations of block 208 may be performed by or in conjunction with a communication controller 126 depicted in FIG. 1.

As represented by block 214, the access node 104 (e.g., the authorization controller 124) determines that the access terminal 102 is not authorized for data access. For example, upon receipt of an access request, the access node 104 may determine whether the requesting node ID is in a list of authorized nodes 134 maintained by the access node 104. Also, the access node 104 may assume that a node that sends a signaling-only access request is not authorized for data access.

As represented by block 216, the access terminal 102 may be authorized for signaling-only access (e.g., by the authorization controller 124) even though the access terminal 102 is not authorized for data access. Consequently, one or more signaling-only links may be established between the nodes 102 and 104 (e.g., by cooperation of the communication controllers 126 and 128). Here, a signaling set may be defined to enable signaling exchange instead of broadcasting exchange between the nodes 102 and 104 in the event the latter is not permitted. As mentioned above, such a link may be established as a result of a registration request, an access request, or some other event or condition.

A signaling-only link may take various forms. In some cases the nodes 102 and 104 may use different dedicated messages for normal traffic (e.g., a signaling and data route) and signaling-only traffic (e.g., a signaling route). In other cases the nodes 102 and 104 may employ common messages for carrying data and signaling traffic or signaling-only traffic. In these cases, a field (e.g., a bit) may be defined in a message to indicate whether the message is associated with a normal traffic or signaling only. In some cases a route may be established with through the use of a specific type of signaling (e.g., a special request to indicate that a route is being opened for signaling only). In some aspects, a signaling set may be maintained in a similar manner as an active set is managed (e.g., based on the strength of pilot signals heard in a neighborhood). Furthermore, signaling may be exchanged in various ways such as, for example, over-the-air, over a backhaul, via layer 1 or layer 2 signaling (e.g., as control signals or actual messages).

A signaling-only link may carry various types of information. For example, a signaling-only link may carry one or more of: registration information, service request information, quality of service information, authentication information, reservation of resources information, handoff request information, interference management information, loading information, or other types of information.

In some aspects, security associated with signaling-only association may be different than security associated with normal traffic. For example, a restricted access point may not be authorized to access an access terminal's full session or credentials if the access point is not serving the access terminal. Thus, to authenticate an access terminal, different cryptographic techniques (e.g., encryption) may be employed for the signaling.

As represented by block 218, in some cases signaling-only access is established from the access node 104 to the access terminal 102. For example, the access node 104 may page the access terminal 102 in response to page requests from the mobility manager or some other node (e.g., a neighbor access node). Other types of signaling may include, for example, one or more of: registration information, service request information, quality of service information, authentication information, reservation of resources information, handoff request information, interference management information, loading information, or some other type of information.

As represented by block 220, in some cases signaling-only access is established from the access terminal 102 to the access node 104. For example, the access terminal 102 may transmit signaling over-the-air or over the backhaul (e.g., via the access node 106) to the access node 104. In some cases, this signaling is destined for the access terminal 104. This signaling may include, for example, one or more of: interference management information, quality of service information, loading information, or some other type of information.

As represented by block 222, the access node 104 may forward received signaling to another node. In some cases this signaling is destined for the mobility manager 108. This signaling may include, for example, one or more of: registration information, service request information, quality of service configuration information, authentication information, or some other type of information. In some cases the signaling is destined for the access terminal 106. This signaling may include, for example, one or more of: registration information, service request information, quality of service configuration information, authentication information, reservation of resources information, handoff request information, interference management information, or some other type of information.

The access node 104 (e.g., the transceiver 112) may forward received signaling to another node in various ways. In some cases, the transceiver 112 uses different techniques for receiving and sending signaling. For example, the receiver 120 may receive signaling using a first frequency band and/or a first type of technology. However, the transmitter 118 may forward the received signaling to another node using a second frequency band and/or a second type of technology. As a specific example, the access node 104 may receive signal via a wireless link and forward signaling to a node via a wireless link (e.g., on a different carrier) or via a wired link (e.g., an electrical or optical link). Thus, in some aspects, the transceiver 112 may include components that support wireless and wired connectivity.

Referring now to FIG. 3, as mentioned above a node (e.g., the wireless node 102) may establish signaling with one node and access (e.g., data access) another node. For purposes of illustration, the operations of FIG. 3 will be described in conjunction with a scenario where the access terminal 102 receives pages from one node and accesses another node. It should be appreciated that the teachings herein may be applicable to other types of signaling, other types of access, other types of nodes, and other types of communication systems.

A decision to receive pages from one node and access another node may be based on various factors. In a scenario as described above in conjunction with FIG. 2, the access terminal 102 may not be authorized for data access at the access node 104 at which the access terminal 102 is idling. For example, the access node 104 may be a restricted femto or pico node as described below. To avoid missing pages due to interfering transmission by the access node 104, however, the access terminal 102 may elect to receive pages from the access node 104 even though the access terminal 102 may elect to gain network access (e.g., data access) via the access node 106 (e.g., a macro node).

Figure 4:
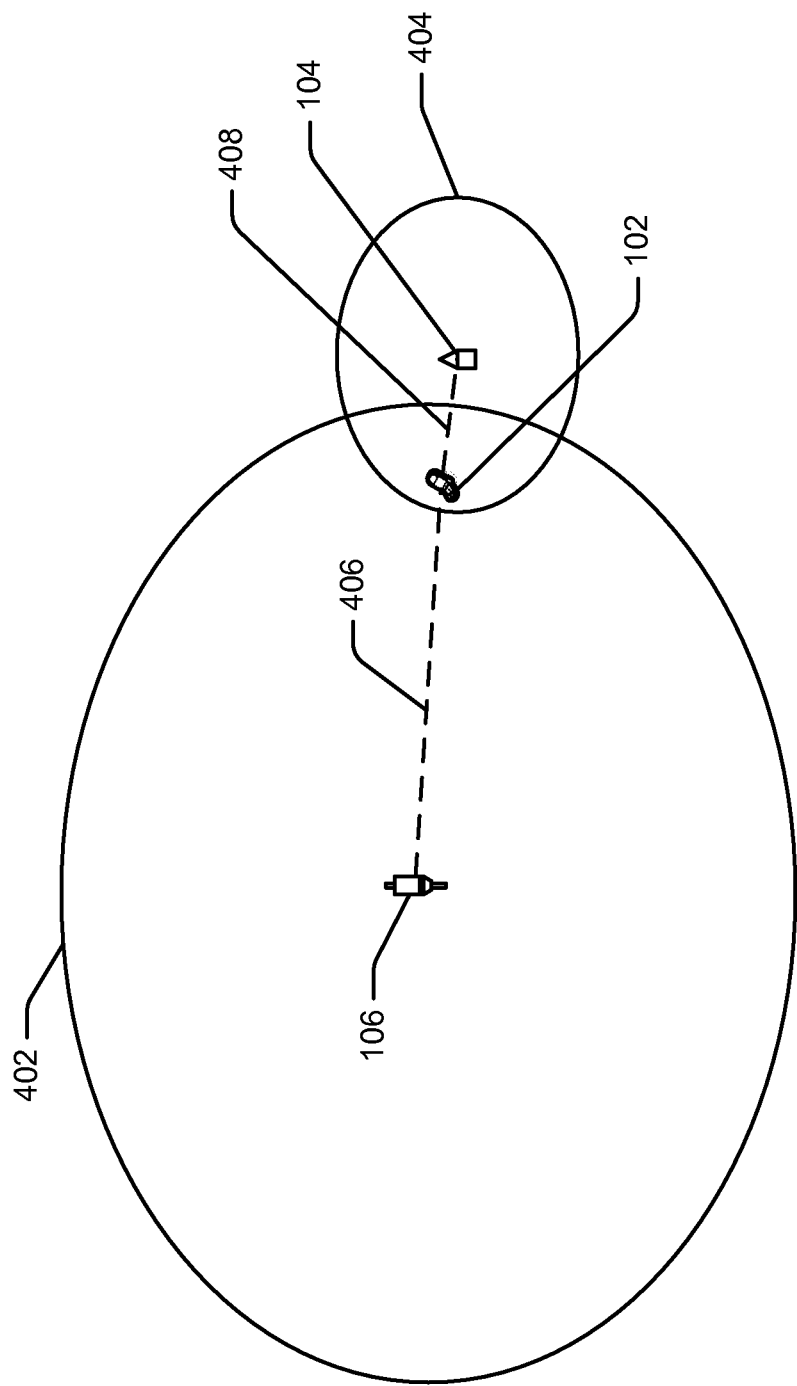
FIG. 4 is a simplified diagram illustrating a sample scenario where a node may receive pages from one node and access another node.

FIG. 4 illustrates another scenario. In this example, the access terminal 102 is within a coverage area 402 associated with the access node 106 and is also within a coverage area 404 associated with the access node 104. Here, the access node 106 (e.g., a macro node) may provide a relatively wide coverage area, while the access node 104 (e.g., a femto or pico node) may provide a much smaller coverage area. In addition, the distance of the path 406 between the nodes 102 and 106 may be much longer than the distance of the path 408 between the nodes 102 and 104.

In this case, the access terminal 102 may elect to receive pages from the access node 106 while electing to access the access node 104. For example, the access node 106 may be selected for paging if it is associated with better geometry than the node 104 (e.g., the access node 106 provides higher C/I than the access node 104).

Conversely, the access node 104 may be selected for access if it provides better service than the access node 106 and/or provides service that is not available from the access node 106. For example, as compared to the access node 106, the access node 104 may be associated with a lower path loss, may provide better scheduling (e.g., more data per schedule, shorter delay to be scheduled, advantageous schedule times), may provide higher throughput, or may provide better service in some other way.

At block 302 of FIG. 3, the access terminal 102 (e.g., the paging controller 136) thus identifies a node for providing paging for the access terminal 102. Such an operation may be performed, for example, whenever the access terminal 102 detects a new access node. As mentioned above, in the example of FIG. 2 the access terminal 102 may identify the access node 104 for providing paging while in the example of FIG. 4 the access terminal 102 may identify the access node 106 for providing paging.

As represented by block 304, the access terminal 102 (e.g., an access controller 142) identifies an access node to access (e.g., access node 106) in the event the access terminal 102 receives a page from the node identified at block 302. As mentioned above, this operation may be based on the relative service provided by the access nodes and/or based on whether the access terminal 102 is authorized for access at a given node. Thus, in the example of FIG. 2 the access terminal 102 may elect to access the access node 106 while in the example of FIG. 4 the access terminal 102 may elect to access the access node 104.

As represented by block 306, the access terminal 102 waits for pages from the node identified at block 302. Here, it should be appreciated that some types of access nodes may not page another node unless the node specifically requests to be paged by that access node. Thus, at block 306 the access terminal 102 may commence receiving pages from the identified node once the network is configured to do so. In some aspects, this may be accomplished by the access terminal 102 sending a message (e.g., in conjunction with registration) to the identified node or to an entity that controls paging in the network (e.g., the mobility manager 108) to inform the entity that the node wishes to be paged by a particular node, cell, zone, sector, tracking area, etc. An example of the latter operation is described below in conjunction with FIG. 5.

As represented by block 308, upon receipt of a page from the designated access node, the access terminal 102 (e.g., the communication controller 126) may access the access node selected at block 304. As represented by block 310, once the access terminal 102 is no longer actively accessing the access node that was identified for access, the access terminal 102 may return to idling on the access node that was identified for paging at block 302 (e.g., operational flow returns to block 306) or the access terminal 102 may elect to remain on the node designated for access. As an example of the latter case, at block 312 the access terminal 102 may idle on the second node waiting for a page on the second node. If a page is received, the access terminal 102 accesses the access node again at block 308.

Referring now to FIG. 5, for illustration purposes, sample operations relating to one method of establishing paging at a restricted node will be described. It should be appreciated that other techniques may be employed to establish paging at a restricted node (e.g., as described above). In the example of FIG. 5, the access terminal 102 (e.g., the paging controller 136) maintains a supplemental (e.g., suggested) paging set ("SPS") 138 that may be used in addition to a standard paging set (e.g., tracking area-based, zone-based, distance-based) that is implemented by a network. In some aspects, the SPS 138 may take the form of a list that specifies entities that may page the access terminal 102. For convenience, the following discussion refers to an SPS that includes a list of access node identifiers ("IDs"). It should be appreciated, however, that an SPS may include other types of entries (e.g., sector IDs, cell IDs, etc.).

At block 502 of FIG. 5, the access terminal 102 discovers the existence of a node (e.g., a restricted node) that may not page another node (e.g., a node that is not authorized for data access) unless that node specifically request to be paged there. For example, the access node 104 (e.g., a given sector of that node) may advertise SPS-related information (e.g., an SPS-bit) that indicates that the access node 104 may not normally receive page requests (fan-in) from its neighboring access nodes, or may not fan-out page requests to its neighboring access nodes. A femto node is an example of an access node that may advertise this information.

In some implementations, the access terminal 102 may be able to infer the need for an SPS based on one or more of the parameter settings of distance, zone, sector identifier ("SID"), or network identifier ("NID"). In such implementations, the access node 104 may not transmit an SPS-bit over the air.

At block 504 the access terminal 102 may add the ID of the access node 104 to its SPS 138 if this ID is not already in the SPS 138. As mentioned above, in some cases a decision to add the access node 104 to the SPS 138 may be based on at least one of: receipt of an indication such as an SPS-bit from the access node 104, an inference of the need to add the access node 104 to the SPS 138, a determination that the access node 104 has higher C/I, or a determination that the access terminal 102 is not authorized to access the access node 104. In some aspects, a decision to add the access node 104 may be based on whether the access terminal 102 will be idling at the access node 104 (e.g., if it is likely to do so in the near future).

The access terminal 102 may maintain its SPS 138 by always adding the strongest access node (e.g., a sector of the access node) to the SPS 138. In some aspects, the access terminal 102 also may add the neighbors of that access node to the SPS 138. If the SPS 138 is not needed (e.g., when the access terminal 102 is idling on a macro node), there may be no need to add the neighbors of the macro node to the SPS 138 since those neighbors may automatically page the access terminal 102 based on standard paging rules (e.g., tracking area-based, zone-based, distance-based). Additionally, if the access terminal 102 can hear a home femto node, it may automatically add the home femto node to the SPS 138. If the access terminal 102 is currently registered at its home macro node (e.g., the macro node which is the strongest neighbor of its home femto node), then the access terminal 102 may automatically add the home femto node to its SPS 138.

Various provisions may be employed to manage the number of entries in the SPS 138. For example, in the event the signal of an access node listed in the SPS 138 remains too weak for a period of time (e.g., the carrier-to-interference ratio associated with the access node is below a threshold level) the access node (and optionally any neighbors added with this access node) may be dropped from the SPS 138. Here, a timer may commence counting when the signal from the access node falls below the designated threshold and continue counting as long as this condition holds true. The access node may then be dropped from the SPS 138 if a defined count is reached. In some cases, an access node that may otherwise be dropped from the SPS 138 may instead be retained in the SPS 138. For example, a designated access node may remain in the SPS 138 if it is a neighbor of some other access node (e.g., whereby it is likely that the access terminal 102 will likely visit the designated access node in the near future). Furthermore, if the SPS 138 reaches its size limit, one or more access nodes may be dropped based on some criterion or threshold (e.g., the access nodes with the longest running timers may be dropped). In some cases an access node may be dropped from the SPS 138 when the access terminal 102 registers at a new access node that does not advertise an SPS-bit (or some other similar indication). In some cases an access node may be dropped from the SPS 138 based on the access terminal 102 determining that it would be paged by the access node due to standard paging rules (e.g., tracking area, zone, distance).

At block 506, the access terminal 102 (e.g., the paging controller 136) may then send the SPS 138 including the ID of the access node 104 to the mobility manager 108 if the mobility manager 108 does not already have this information (e.g., via a previous transmission of the SPS 138). In some aspects, the SPS 138 may be sent in conjunction with registration. For example, the access terminal 102 may include the SPS 138 in a registration message it sends to the access node 104 (if allowed) or to another node (e.g., access node 106). The access terminal 102 may communicate the SPS 138 to the mobility manager 108 when the strongest access node (e.g., sector) detected by the access terminal 102 was not in the last SPS 138 sent to the mobility manager 108, and the access terminal 102 needs to make use of the SPS functionality (e.g. the SPS-bit is indicated for the sector).

In some aspects, the access terminal 102 may optimize its communication of the SPS 138 to the mobility manager 108. For example, the access terminal 102 may only send the delta between the last SPS that was sent and the current SPS. Also, the access terminal 102 may list a cell (or sector, or access node) and a zone/distance, rather than list each cell explicitly.

An SPS 140 for the access terminal 102 may be maintained at the mobility manager 108. The mobility manager 108 may use any newly received SPS to overwrite the current SPS 140 stored at the mobility manager 108. The mobility manager 108 may take the form of, for example, a mobility manager entity ("MME"), a session reference network controller ("SRNC"), or some other similar entity or entities.

At block 508, the network (e.g., under the control of the mobility manager 108) may cause the access terminal 102 to be paged at all access nodes listed in the SPS, in addition to the access nodes that would page the access terminal 102 according to the network's standard paging rules (e.g., tracking area-based rules, zone-based rules, distance-based rules). For example, at block 510 the access node 104 receives a page request from the mobility manager 108 which causes the access node 104 to page the access terminal 102.

In some aspects, the SPS may be deployed in conjunction with predicting which access nodes will be visited by the access terminal 102 in the near future. Here, once the network receives the SPS, the network may commence paging the access terminal 102 at the designated access nodes. Thus, when the access terminal 102 visits an access node (e.g., a femto node) that was already mentioned in the last SPS, the access terminal 102 need not register again. The use of a forward-looking SPS thus allows the access terminal 102 to reduce its registration load.

As represented by block 512, the access terminal 102 receives the page from the access node 104. In response to the page, the access terminal 102 may access another access node (e.g., the access node 106 as described above).

As mentioned above, in some aspects the teachings herein may be employed in a network that includes macro scale coverage (e.g., a macro cellular network environment) and smaller scale coverage (e.g., a residential or building network environment). In such a network, as an access terminal ("AT") moves through the network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, a given cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a home NodeB, home eNodeB, access point base station, femto cell, and so on.

Figure 6:
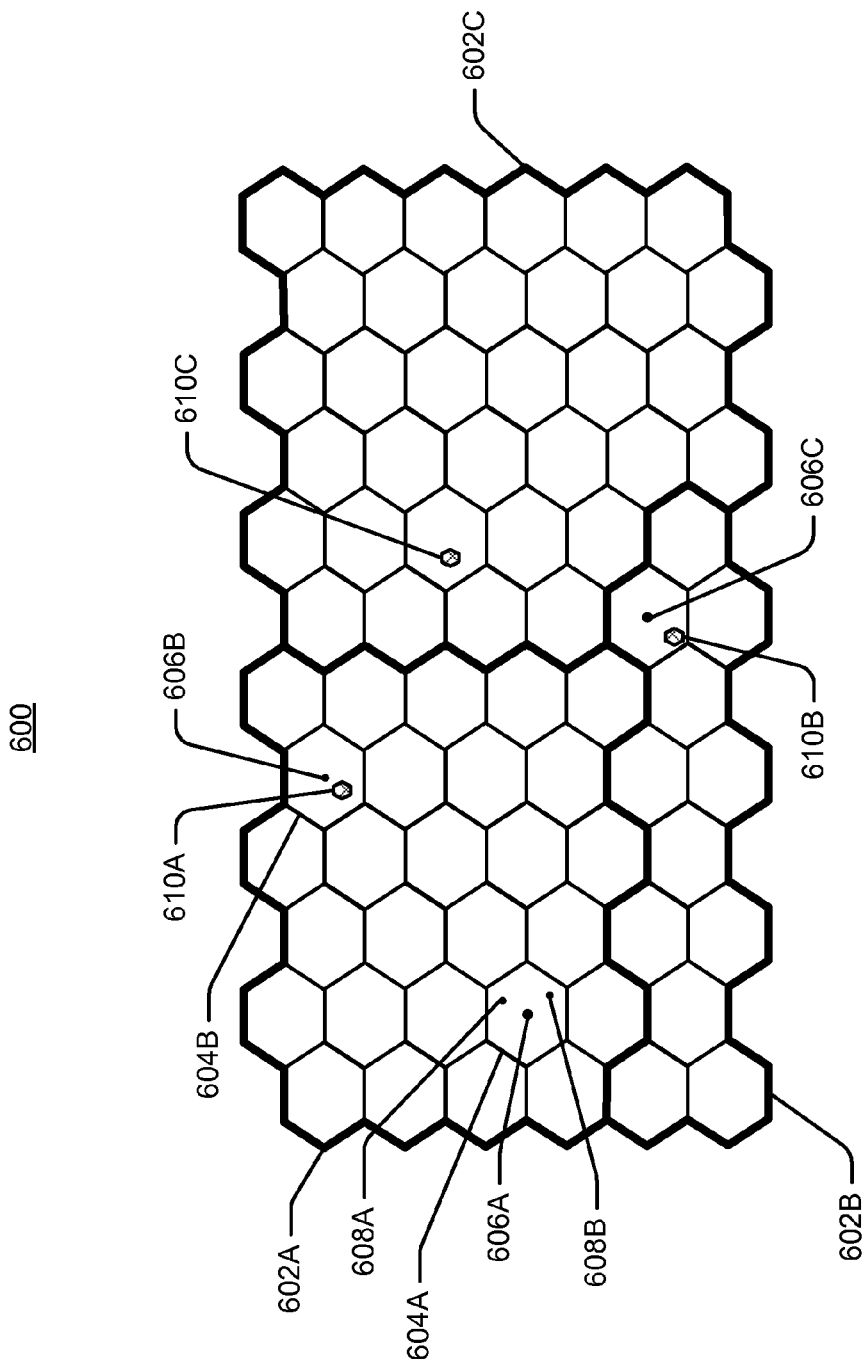
FIG. 6 is a simplified diagram illustrating coverage areas for wireless communication.

FIG. 6 illustrates an example of a coverage map 600 for a network where several tracking areas 602 (or routing areas or location areas) are defined. Specifically, areas of coverage associated with tracking areas 602A, 602B, and 602C are delineated by the wide lines in FIG. 6.

The system provides wireless communication via multiple cells 604 (represented by the hexagons), such as, for example, macro cells 604A and 604B, with each cell being serviced by a corresponding access node 606 (e.g., access nodes 606A-606C). As shown in FIG. 6, access terminals 608 (e.g., access terminals 608A and 608B) may be dispersed at various locations throughout the network at a given point in time. Each access terminal 608 may communicate with one or more access nodes 606 on a forward link ("FL") and/or a reverse link ("RL") at a given moment, depending upon whether the access terminal 608 is active and whether it is in soft handoff, for example. The network may provide service over a large geographic region. For example, the macro cells 604 may cover several blocks in a neighborhood.

The tracking areas 602 also include femto coverage areas 610. In this example, each of the femto coverage areas 610 (e.g., femto coverage area 610A) is depicted within a macro coverage area 604 (e.g., macro coverage area 604B). It should be appreciated, however, that a femto coverage area 610 may not lie entirely within a macro coverage area 604. In practice, a large number of femto coverage areas 610 may be defined within a given tracking area 602 or macro coverage area 604. Also, one or more pico coverage areas (not shown) may be defined within a given tracking area 602 or macro coverage area 604. To reduce the complexity of FIG. 6, only a few access nodes 606, access terminals 608, and femto nodes 610 are shown.

Figure 7:
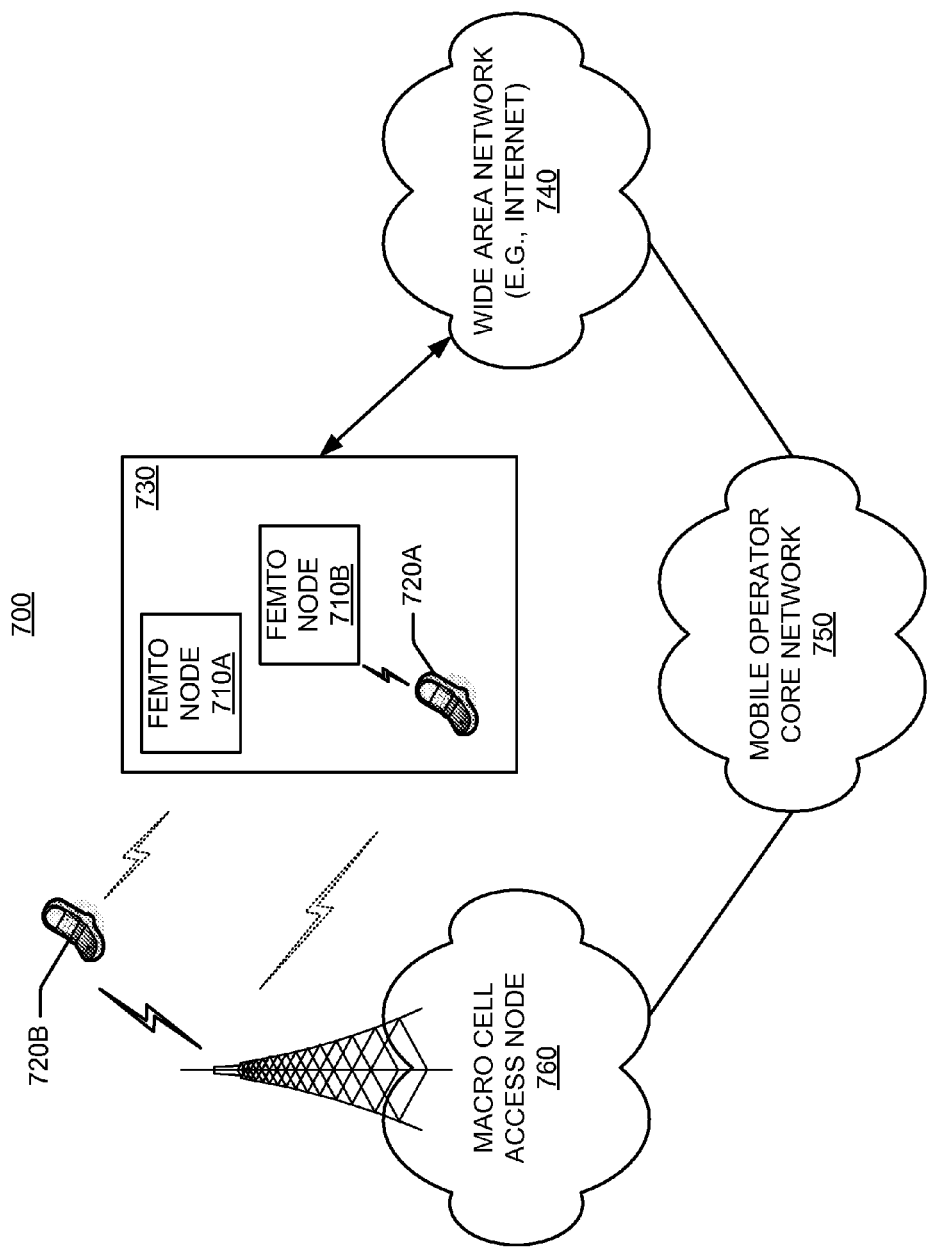
FIG. 7 is a simplified diagram of a wireless communication system including femto nodes.

Connectivity for a femto node environment may be established in various ways. For example, FIG. 7 illustrates a communication system 700 where one or more femto nodes are deployed within a network environment. Specifically, the system 700 includes multiple femto nodes 710 (e.g., femto nodes 710A and 710B) installed in a relatively small scale network environment (e.g., in one or more user residences 730). Each femto node 710 may be coupled to a wide area network 740 (e.g., the Internet) and a mobile operator core network 750 via a DSL router, a cable modem, a wireless link, or other connectivity means (not shown). As discussed herein, each femto node 710 may be configured to serve associated access terminals 720 (e.g., access terminal 720A) and, optionally, other access terminals 720 (e.g., access terminal 720B). In other words, access to femto nodes 710 may be restricted whereby a given access terminal 720 may be served by a set of designated (e.g., home) femto node(s) 710 but may not be served by any non-designated femto nodes 710 (e.g., a neighbor's femto node 710).

The owner of a femto node 710 may subscribe to mobile service, such as, for example, 3G mobile service offered through the mobile operator core network 750. In addition, an access terminal 720 may be capable of operating both in macro environments and in smaller scale (e.g., residential) network environments. In other words, depending on the current location of the access terminal 720, the access terminal 720 may be served by an access node 760 of the macro cell mobile network 750 or by any one of a set of femto nodes 710 (e.g., the femto nodes 710A and 710B that reside within a corresponding user residence 730). For example, when a subscriber is outside his home, he is served by a standard macro access node (e.g., the node 760) and when the subscriber is at home, he/she is served by a femto node (e.g., the node 710B). Here, it should be appreciated that a femto node 710 may be backward compatible with existing access terminals 720.

A femto node 710 may be deployed on a single frequency or, in the alternative, on multiple frequencies. Depending on the particular configuration, the single frequency or one or more of the multiple frequencies may overlap with one or more frequencies used by a macro node (e.g., the node 760).

In some aspects, an access terminal 720 may be configured to connect to a preferred femto node (e.g., the home femto node of the access terminal 720) whenever such connectivity is possible. For example, whenever a subscriber's access terminal 720 is within the subscriber's residence 730, it may be desired that the access terminal 720 communicate only with a home femto node 710.

In some aspects, if the access terminal 720 operates within the macro cellular network 750 but is not residing on its most preferred network (e.g., as defined in a preferred roaming list), the access terminal 720 may continue to search for the most preferred network (e.g., the preferred femto node 710) using a Better System Reselection ("BSR"), which may involve a periodic scanning of available systems to determine whether better systems are currently available, and subsequent efforts to associate with such preferred systems. With the acquisition entry, the access terminal 720 may limit the search for specific band and channel. For example, the search for the most preferred system may be repeated periodically.

Upon discovery of a preferred femto node 710, the access terminal 720 selects the femto node 710 for camping within its coverage area.

As mentioned above, an access node such as a femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 710 that reside within the corresponding user residence 730).

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 8:
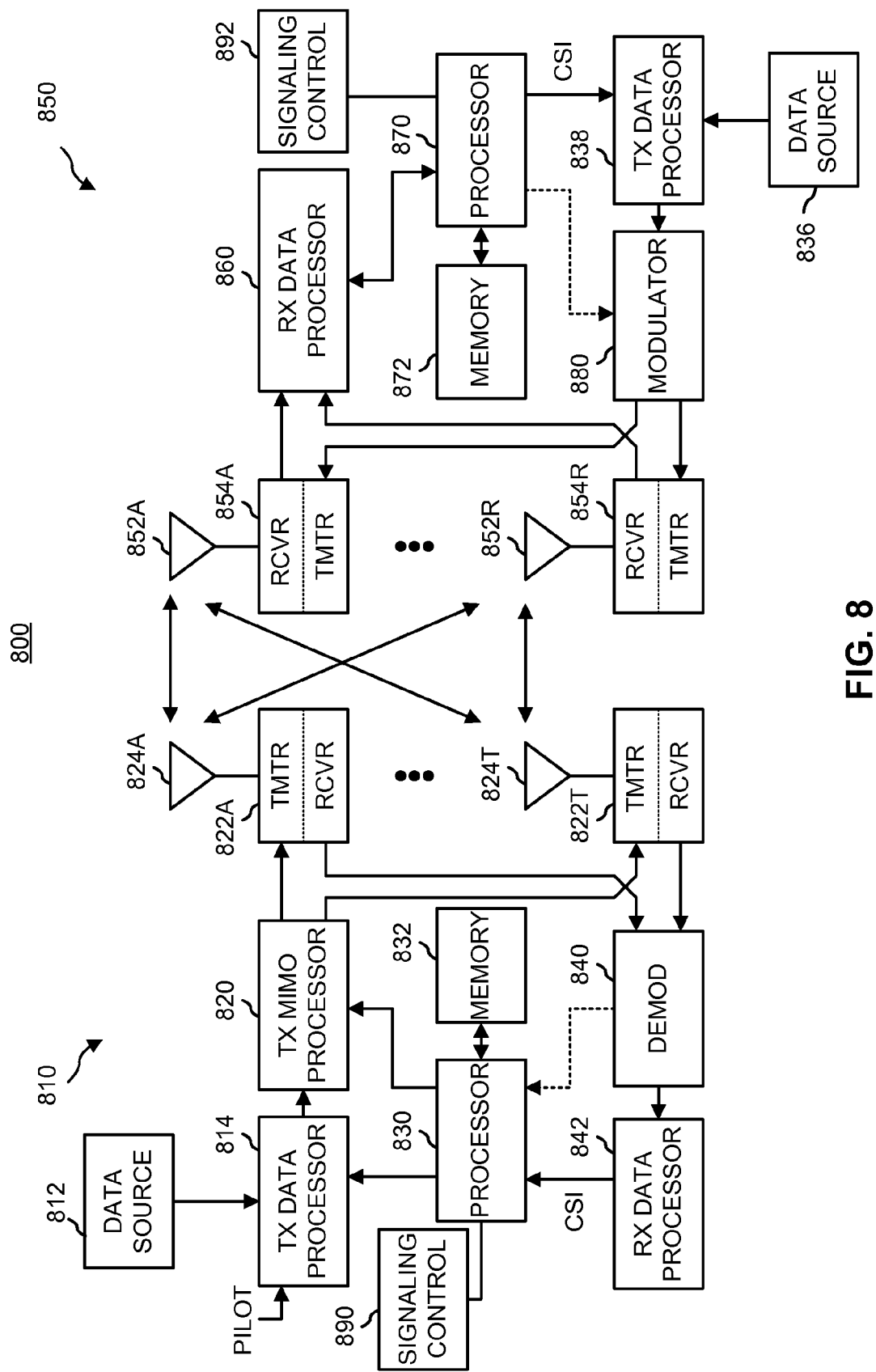
FIG. 8 is a simplified block diagram of several sample aspects of communication components.

The teachings herein may be incorporated into a node (e.g., a device) employing various components for communicating with at least one other node. FIG. 8 depicts several sample components that may be employed to facilitate communication between nodes. Specifically, FIG. 8 illustrates a wireless device 810 (e.g., an access point) and a wireless device 850 (e.g., an access terminal) of a MIMO system 800. At the device 810, traffic data for a number of data streams is provided from a data source 812 to a transmit ("TX") data processor 814.

In some aspects, each data stream is transmitted over a respective transmit antenna. The TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 830. A data memory 832 may store program code, data, and other information used by the processor 830 or other components of the device 810.

The modulation symbols for all data streams are then provided to a TX MIMO processor 820, which may further process the modulation symbols (e.g., for OFDM). The TX MIMO processor 820 then provides $N_T$ modulation symbol streams to $N_T$ transceivers ("XCVR") 822A through 822T. In some aspects, the TX MIMO processor 820 applies beam-forming weights to the symbols of the data streams and to the antenna from which the symbol is being transmitted.

Each transceiver 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 822A through 822T are then transmitted from $N_T$ antennas 824A through 824T, respectively.

At the device 850, the transmitted modulated signals are received by $N_R$ antennas 852A through 852R and the received signal from each antenna 852 is provided to a respective transceiver ("XCVR") 854A through 854R. Each transceiver 854 conditions (e.g., filters, amplifies, and downconverts) a respective received signal, digitizes the conditioned signal to provide samples, and further processes the samples to provide a corresponding "received" symbol stream.

A receive ("RX") data processor 860 then receives and processes the $N_R$ received symbol streams from $N_R$ transceivers 854 based on a particular receiver processing technique to provide $N_T$ "detected" symbol streams. The RX data processor 860 then demodulates, deinterleaves, and decodes each detected symbol stream to recover the traffic data for the data stream. The processing by the RX data processor 860 is complementary to that performed by the TX MIMO processor 820 and the TX data processor 814 at the device 810.

A processor 870 periodically determines which pre-coding matrix to use (discussed below). The processor 870 formulates a reverse link message comprising a matrix index portion and a rank value portion. A data memory 872 may store program code, data, and other information used by the processor 870 or other components of the device 850.

The reverse link message may comprise various types of information regarding the communication link and/or the received data stream. The reverse link message is then processed by a TX data processor 838, which also receives traffic data for a number of data streams from a data source 836, modulated by a modulator 880, conditioned by the transceivers 854A through 854R, and transmitted back to the device 810.

At the device 810, the modulated signals from the device 850 are received by the antennas 824, conditioned by the transceivers 822, demodulated by a demodulator ("DEMOD") 840, and processed by a RX data processor 842 to extract the reverse link message transmitted by the device 850. The processor 830 then determines which pre-coding matrix to use for determining the beam-forming weights then processes the extracted message.

FIG. 8 also illustrates that the communication components may include one or more components that perform signaling control operations as taught herein. For example, a signaling control component 890 may cooperate with the processor 830 and/or other components of the device 810 to send/receive signals to/from another device (e.g., device 850) as taught herein. Similarly, a signaling control component 892 may cooperate with the processor 870 and/or other components of the device 850 to send/receive signals to/from another device (e.g., device 810). It should be appreciated that for each device 810 and 850 the functionality of two or more of the described components may be provided by a single component. For example, a single processing component may provide the functionality of the signaling control component 890 and the processor 830 and a single processing component may provide the functionality of the signaling control component 892 and the processor 870.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (IxRTT, 1xEV-DO Rel0, RevA, RevB) technology and other technologies.

The teachings herein may be incorporated into (e.g., implemented within or performed by) a variety of apparatuses (e.g., nodes). For example, an access node as discussed herein (e.g., a macro node, a femto node, or a pico node) may be configured or referred to as an access point ("AP"), a base station ("BS"), a NodeB, a radio network controller ("RNC"), an eNodeB, a base station controller ("BSC"), a base transceiver station ("BTS"), a transceiver function ("TF"), a radio router, a radio transceiver, a basic service set ("BSS"), an extended service set ("ESS"), a radio base station ("RBS"), or some other terminology.

In addition, an access terminal as discussed herein may be referred to as a mobile station, user equipment, a subscriber unit, a subscriber station, a remote station, a remote terminal, a user terminal, a user agent, or a user device. In some implementations such a node may consist of, be implemented within, or include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem.

Accordingly, one or more aspects taught herein may consist of, be implemented within, or include variety types of apparatuses. Such an apparatus may comprise a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access node (e.g., an access point) for a communication system. Such an access node may provide, for example, connectivity for or to a network (e.g., a wide area network such as the Internet or a cellular network) via a wired or wireless communication link. Accordingly, the access node may enable another node (e.g., an access terminal) to access the network or some other functionality. In addition, it should be appreciated that one or both of the nodes may be portable or, in some cases, relatively non-portable. Also, it should be appreciated that a wireless node (e.g., a wireless device) also may be capable of transmitting and/or receiving information in a non-wireless manner via an appropriate communication interface (e.g., via a wired connection).

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components (e.g., transmitters 114 and 118 and receivers 116 and 120) that may include various components (e.g., signal generators and signal processors) that facilitate communication over a wireless medium.

Figure 9:
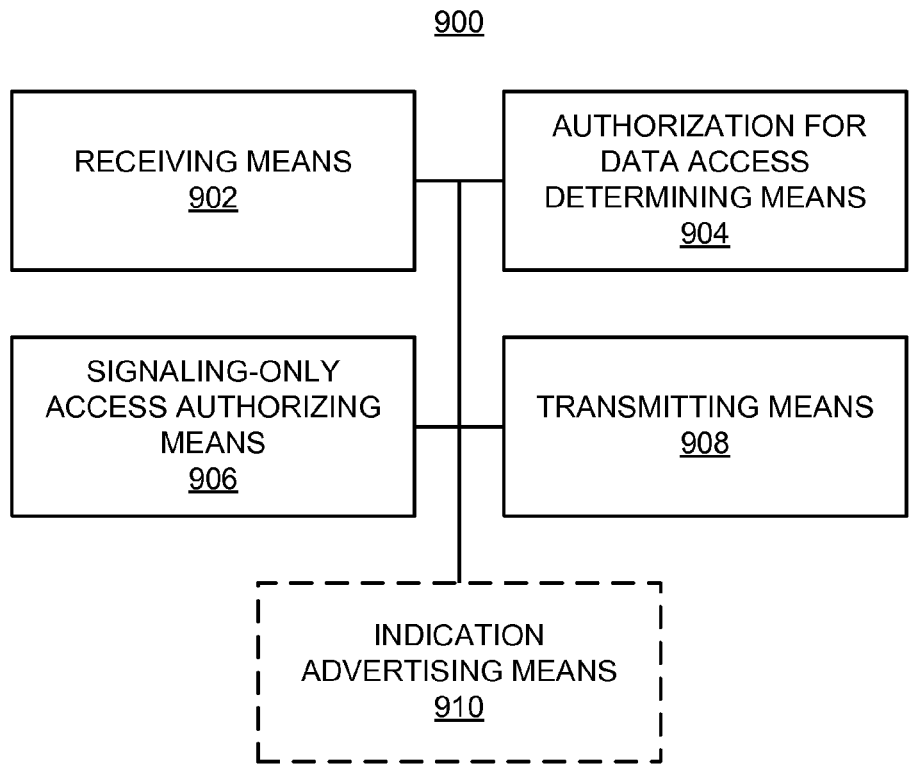
FIGS. 9-11 are simplified block diagrams of several sample aspects of apparatuses configured to provide signaling as taught herein.
Figure 10:
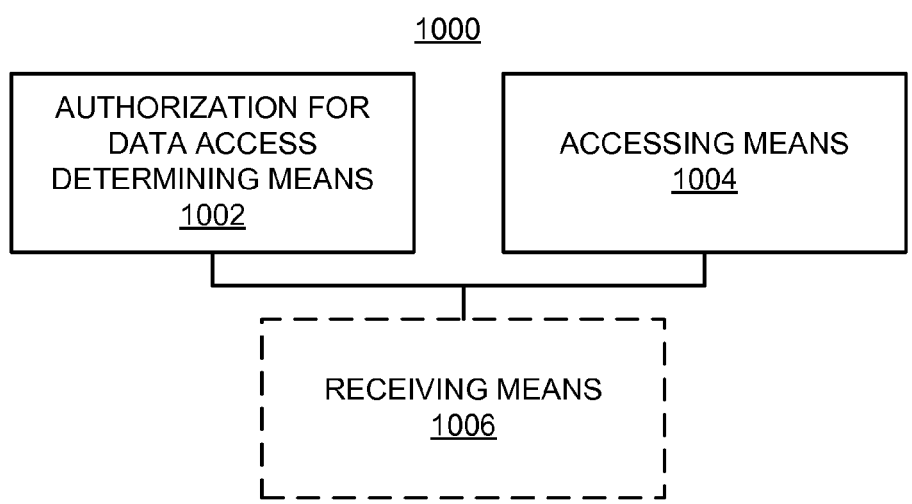
Figure 11:
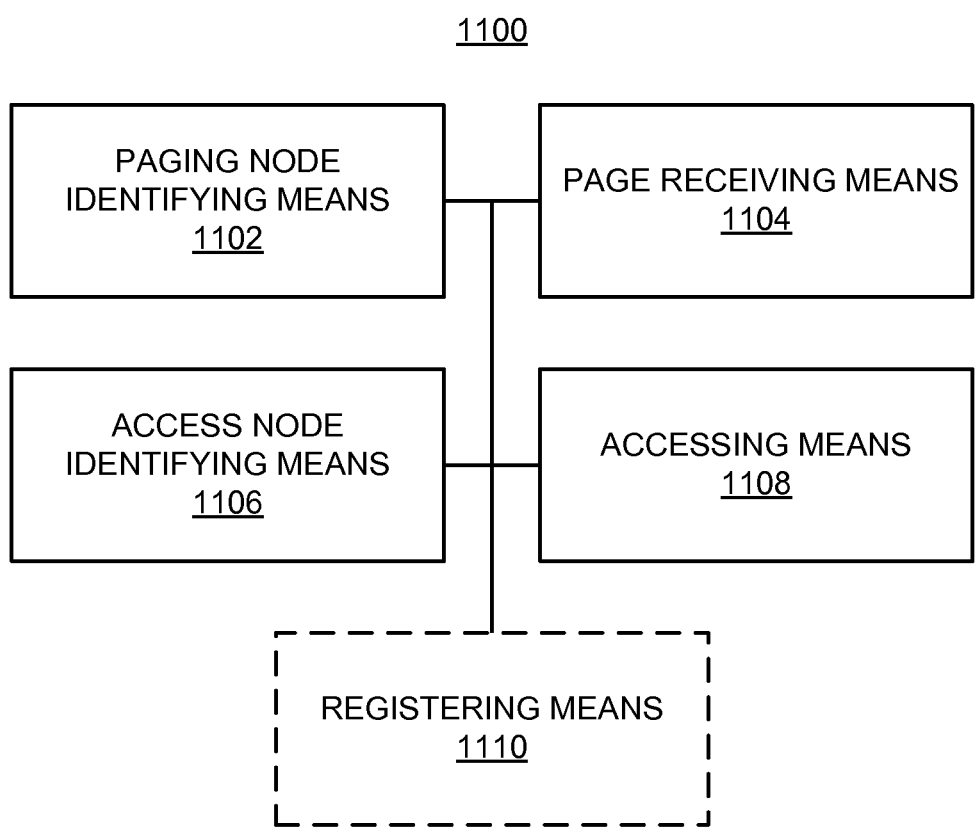

The components described herein may be implemented in a variety of ways. Referring to FIGS. 9-11, apparatuses 900, 1000, and 1100 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 9-11 relate to optional functionality.

The apparatuses 900, 1000, and 1100 may include one or more modules that may perform one or more of the functions described above with regard to various figures. For example, a receiving means 902 may correspond to, for example, a receiver 120 as discussed herein. An authorization for data access determining means 904 may correspond to, for example, an authorization controller 124 as discussed herein. A signaling-only access authorizing means 906 may correspond to, for example, an authorization controller 124 as discussed herein. A transmitting means 908 may correspond to, for example, a transmitter 118 as discussed herein. An indication advertising means 910 may correspond to, for example, an authorization controller 124 as discussed herein. An authorization for data access determining means 1002 may correspond to, for example, an authorization controller 122 as discussed herein. An accessing means 1004 may correspond to, for example, a communication controller 126 as discussed herein. A receiving means 1006 may correspond to, for example, a receiver 116 as discussed herein. A paging node identifying means 1102 may correspond to, for example, a paging controller 136 as discussed herein. A page receiving means 1104 may correspond to, for example, a receiver 116 as discussed herein. An access node identifying means 1106 may correspond to, for example, an access controller 142 as discussed herein. An accessing means 1 108 may correspond to, for example, a communication controller 126 as discussed herein. A registering means 1110 may correspond to, for example, a communication controller 126 as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
receiving an access request from a node;
determining that the node is not authorized for data access;
authorizing the node for signaling-only access based on the determination; and
transmitting signaling over-the-air to the node based on the determination.

2. The method of claim 1, wherein the transmitted signaling comprises at least one of the group consisting of: registration information, service request information, quality of service information, authentication information, reservation of resources information, handoff request information, interference management information, and loading information.

3. The method of claim 1, further comprising receiving signaling over-the-air from the node.

4. The method of claim 3, wherein:
the signaling is received at a base station; and
the received signaling is destined for the base station.

5. The method of claim 4, wherein the received signaling comprises at least one of the group consisting of: interference management information, quality of service information, and loading information.

6. The method of claim 3, further comprising sending the received signaling to a mobility manager.

7. The method of claim 6, wherein the received signaling comprises at least one of the group consisting of: registration information, service request information, quality of service configuration information, and authentication information.

8. The method of claim 3, wherein the signaling is received at a base station, the method further comprising sending the received signaling to another base station.

9. The method of claim 8, wherein:
the base station receives the received signaling using a first frequency band and a first type of technology; and
the base station sends the received signaling to the another base station using a second frequency band and a second type of technology.

10. The method of claim 8, wherein the received signaling comprises at least one of the group consisting of: registration information, service request information, quality of service configuration information, authentication information, reservation of resources information, handoff request information, and interference management information.

11. The method of claim 3, wherein the received signaling comprises at least one of the group consisting of: registration information, service request information, quality of service information, authentication information, reservation of resources information, handoff request information, interference management information, and loading information.

12. The method of claim 1, wherein the access request is received from the node via a network node.

13. The method of claim 1, wherein the access request is received over-the-air from the node.

14. The method of claim 1, further comprising advertising an indication of restriction to indicate that at least one of the group consisting of: signaling, data access, registration, paging, and service to at least one node is not provided.

15. The method of claim 1, further comprising advertising an indication that registration requests are accepted from nodes that are not authorized for data access.

16. The method of claim 1, wherein the signaling is transmitted by a femto node or a pico node.

17. The method of claim 1, wherein the node comprises an access terminal.

18. An apparatus for wireless communication, comprising:
a receiver configured to receive an access request from a node;
an authorization controller configured to determine that the node is not authorized for data access, and further configured to authorize the node for signaling-only access based on the determination; and
a transmitter configured to transmit signaling over-the-air to the node based on the determination.

19. The apparatus of claim 18, wherein the transmitted signaling comprises at least one of the group consisting of: registration information, service request information, quality of service information, authentication information, reservation of resources information, handoff request information, interference management information, and loading information.

20. The apparatus of claim 18, wherein the receiver is further configured to receive signaling over-the-air from the node.

21. The apparatus of claim 20, wherein:
the apparatus is a base station;
the received signaling is destined for the base station; and
the received signaling comprises at least one of the group consisting of: interference management information, quality of service information, and loading information.

22. The apparatus of claim 20, wherein:
the transmitter is further configured to send the received signaling to a mobility manager; and
the received signaling comprises at least one of the group consisting of: registration information, service request information, quality of service configuration information, and authentication information.

23. The apparatus of claim 20, wherein:
the apparatus is a base station;
the receiver is further configured to receive the received signaling using a first frequency band and a first type of technology; and
the transmitter is further configured to send the received signaling to another base station using a second frequency band and a second type of technology.

24. The apparatus of claim 20, wherein:
the apparatus is a base station;
the transmitter is further configured to send the received signaling to another base station; and
the received signaling comprises at least one of the group consisting of: registration information, service request information, quality of service configuration information, authentication information, reservation of resources information, handoff request information, and interference management information.

25. The apparatus of claim 20, wherein the received signaling comprises at least one of the group consisting of: registration information, service request information, quality of service information, authentication information, reservation of resources information, handoff request information, interference management information, and loading information.

26. The apparatus of claim 18, wherein the authorization controller is further configured to cause advertisement of an indication of restriction to indicate that at least one of the group consisting of: signaling, data access, registration, paging, and service to at least one node is not provided.

27. The apparatus of claim 18, wherein the authorization controller is further configured to cause advertisement of an indication that registration requests are accepted from nodes that are not authorized for data access.

28. The apparatus of claim 18, wherein the apparatus is a femto node or a pico node.

29. An apparatus for wireless communication, comprising:
means for receiving an access request from a node;
means for determining that the node is not authorized for data access;
means for authorizing the node for signaling-only access based on the determination; and
means for transmitting signaling over-the-air to the node based on the determination.

30. The apparatus of claim 29, wherein the transmitted signaling comprises at least one of the group consisting of: registration information, service request information, quality of service information, authentication information, reservation of resources information, handoff request information, interference management information, and loading information.

31. The apparatus of claim 29, wherein the means for receiving is configured to receive signaling over-the-air from the node.

32. The apparatus of claim 31, wherein:
the apparatus is a base station;
the received signaling is destined for the base station; and
the received signaling comprises at least one of the group consisting of: interference management information, quality of service information, and loading information.

33. The apparatus of claim 31, wherein:
the means for transmitting is configured to send the received signaling to a mobility manager; and
the received signaling comprises at least one of the group consisting of: registration information, service request information, quality of service configuration information, and authentication information.

34. The apparatus of claim 31, wherein:
the apparatus is a base station;
the means for receiving is further configured to receive the received signaling using a first frequency band and a first type of technology; and
the means for transmitting is configured to send the received signaling to another base station using a second frequency band and a second type of technology.

35. The apparatus of claim 31, wherein:
the apparatus is a base station;
the means for transmitting is configured to send the received signaling to another base station; and
the received signaling comprises at least one of the group consisting of: registration information, service request information, quality of service configuration information, authentication information, reservation of resources information, handoff request information, and interference management information.

36. The apparatus of claim 31, wherein the received signaling comprises at least one of the group consisting of: registration information, service request information, quality of service information, authentication information, reservation of resources information, handoff request information, interference management information, and loading information.

37. The apparatus of claim 29, further comprising means for advertising an indication of restriction to indicate that at least one of the group consisting of: signaling, data access, registration, paging, and service to at least one node is not provided.

38. The apparatus of claim 29, further comprising means for advertising an indication that registration requests are accepted from nodes that are not authorized for data access.

39. The apparatus of claim 29, wherein the apparatus is a femto node or a pico node.

40. A non-transitory computer readable storage medium, comprising:
codes for causing a computer to:
receive an access request from a node;
determine that the node is not authorized for data access;
authorize the node for signaling-only access based on the determination; and
transmit signaling over-the-air to the node based on the determination.

41. The non-transitory computer readable storage medium of claim 40, wherein the transmitted signaling comprises at least one of the group consisting of: registration information, service request information, quality of service information, authentication information, reservation of resources information, handoff request information, interference management information, and loading information.

42. The non-transitory computer readable storage medium of claim 40, further comprising codes for causing the computer to receive signaling over-the-air from the node.

43. The non-transitory computer readable storage medium of claim 42, wherein:
the signaling is received at a base station;
the received signaling is destined for the base station; and
the received signaling comprises at least one of the group consisting of: interference management information, quality of service information, and loading information.

44. The non-transitory computer readable storage medium of claim 42, wherein:
further comprising codes for causing the computer to send the received signaling to a mobility manager; and the received signaling comprises at least one of the group consisting of: registration information, service request information, quality of service configuration information, and authentication information.

45. The non-transitory computer readable storage medium of claim 42, wherein:
the signaling is received at a base station;
the non-transitory computer-readable storage medium further comprises codes for causing the computer to receive the received signaling using a first frequency band and a first type of technology; and
the non-transitory computer-readable storage medium further comprises codes for causing the computer to send the received signaling to another base station using a second frequency band and a second type of technology.

46. The non-transitory computer readable storage medium of claim 42, wherein:
the signaling is received at a base station;
the non-transitory computer-readable storage medium further comprising codes for causing the computer to send the received signaling to another base station; and
the received signaling comprises at least one of the group consisting of: registration information, service request information, quality of service configuration information, authentication information, reservation of resources information, handoff request information, and interference management information.

47. The non-transitory computer readable storage medium of claim 42, wherein the received signaling comprises at least one of the group consisting of: registration information, service request information, quality of service information, authentication information, reservation of resources information, handoff request information, interference management information, and loading information.

48. The non-transitory computer readable storage medium of claim 40, wherein the non-transitory computer-readable storage medium further comprises codes for causing the computer to advertise an indication of restriction to indicate that at least one of the group consisting of: signaling, data access, registration, paging, and service to at least one node is not provided.

49. The non-transitory computer readable storage medium of claim 40, wherein the non-transitory computer-readable medium further comprises codes for causing the computer to advertise an indication that registration requests are accepted from nodes that are not authorized for data access.

50. The non-transitory computer readable storage medium of claim 40, wherein the signaling is transmitted by a femto node or a pico node.

51. A method of wireless communication, comprising:
determining that a first node is not authorized for data access at a second node; and
accessing the second node for signaling based on the determination that the first node is not authorized for data access.

52. The method of claim 51, wherein accessing the second node comprises sending a signaling-only access request to the second node.

53. The method of claim 51, wherein accessing the second node comprises sending an access request to the second node via a network node.

54. The method of claim 51, wherein accessing the second node comprises sending an access request over-the-air to the second node.

55. The method of claim 51, further comprising establishing a signaling-only link with the second node based on the determination.

56. The method of claim 55, further comprising communicating with another node, wherein the signaling-only link is established as a result of the communication.

57. The method of claim 51, wherein accessing the second node comprises transmitting the signaling over-the-air to the second node.

58. The method of claim 57, wherein the transmitted signaling is destined for the second node.

59. The method of claim 58, wherein the transmitted signaling comprises at least one of the group consisting of: interference management information, quality of service information, and loading information.

60. The method of claim 57, wherein the transmitted signaling is destined for a mobility manager.

61. The method of claim 60, wherein the transmitted signaling comprises at least one of the group consisting of: registration information, service request information, quality of service configuration information, and authentication information.

62. The method of claim 57, wherein:
the second node comprises a base station; and
the transmitted signaling is destined for another base station.

63. The method of claim 62, wherein the transmitted signaling comprises at least one of the group consisting of: registration information, service request information, quality of service configuration information, authentication information, reservation of resources information, handoff request information, and interference management information.

64. The method of claim 51, further comprising receiving an indication from the second node over-the-air indicating that the second node is restricted to not provide at least one of the group consisting of: signaling, data access, registration, paging, and service to at least one node.

65. The method of claim 64, further comprising comparing the indication to a list of access identifiers to determine service provided by the second node.

66. The method of claim 51, wherein accessing the second node comprises registering with the second node based on a determination that the second node accepts registration requests from nodes that are not authorized for data access.

67. The method of claim 51, wherein the second node comprises a femto node or a pico node.

68. The method of claim 67, wherein the femto node or the pico node is restricted to not provide at least one of the group consisting of: signaling, data access, registration, paging, and service to at least one node.

69. The method of claim 51, wherein the second node comprises a base station.

70. An apparatus for wireless communication, comprising:
an authorization controller configured to determine that a first node is not authorized for data access at a second node; and
a communication controller configured to access the second node for signaling based on the determination that the first node is not authorized for data access.

71. The apparatus of claim 70, wherein accessing the second node comprises sending an access request to the second node via a network node.

72. The apparatus of claim 70, wherein accessing the second node comprises sending an access request over-the-air to the second node.

73. The apparatus of claim 70, wherein:
the communication controller is further configured to establish a signaling-only link with the second node based on the determination;

the communication controller is further configured to communicate with another node; and the signaling-only link is established as a result of the communication.

74. The apparatus of claim 70, wherein accessing the second node comprises transmitting the signaling over-the-air to the second node.

75. The apparatus of claim 74, wherein:
the transmitted signaling is destined for the second node; and
the transmitted signaling comprises at least one of the group consisting of: interference management information, quality of service information, and loading information.

76. The apparatus of claim 74, wherein:
the transmitted signaling is destined for a mobility manager; and
the transmitted signaling comprises at least one of the group consisting of: registration information, service request information, quality of service configuration information, and authentication information.

77. The apparatus of claim 74, wherein:
the second node comprises a base station;
the transmitted signaling is destined for another base station; and
the transmitted signaling comprises at least one of the group consisting of: registration information, service request information, quality of service configuration information, authentication information, reservation of resources information, handoff request information, and interference management information.

78. The apparatus of claim 70, further comprising a receiver configured to receive an indication from the second node over-the-air indicating that the second node is restricted to not provide at least one of the group consisting of: signaling, data access, registration, paging, and service to at least one node.

79. The apparatus of claim 78, wherein the authorization controller is further configured to compare the indication to a list of access identifiers to determine service provided by the second node.

80. The apparatus of claim 70, wherein accessing the second node comprises registering with the second node based on a determination that the second node accepts registration requests from nodes that are not authorized for data access.

81. The apparatus of claim 70, wherein the second node comprises a femto node or a pico node.

82. The apparatus of claim 81, wherein the femto node or the pico node is restricted to not provide at least one of the group consisting of: signaling, data access, registration, paging, and service to at least one node.

83. An apparatus for wireless communication, comprising:
means for determining that a first node is not authorized for data access at a second node; and
means for accessing the second node for signaling based on the determination that the first node is not authorized for data access.

84. The apparatus of claim 83, wherein accessing the second node comprises sending an access request to the second node via a network node.

85. The apparatus of claim 83, wherein accessing the second node comprises sending an access request over-the-air to the second node.

86. The apparatus of claim 83, wherein:
the means for accessing is configured to establish a signaling-only link with the second node based on the determination;

the means for accessing is further configured to communicate with another node; and
the signaling-only link is established as a result of the communication.

87. The apparatus of claim 83, wherein accessing the second node comprises transmitting the signaling over-the-air to the second node.

88. The apparatus of claim 87, wherein:
the transmitted signaling is destined for the second node; and
the transmitted signaling comprises at least one of the group consisting of: interference management information, quality of service information, and loading information.

89. The apparatus of claim 87, wherein:
the transmitted signaling is destined for a mobility manager; and
the transmitted signaling comprises at least one of the group consisting of: registration information, service request information, quality of service configuration information, and authentication information.

90. The apparatus of claim 87, wherein:
the second node comprises a base station;
the transmitted signaling is destined for another base station; and
the transmitted signaling comprises at least one of the group consisting of: registration information, service request information, quality of service configuration information, authentication information, reservation of resources information, handoff request information, and interference management information.

91. The apparatus of claim 83, further comprising means for receiving an indication from the second node over-the-air indicating that the second node is restricted to not provide at least one of the group consisting of: signaling, data access, registration, paging, and service to at least one node.

92. The apparatus of claim 91, wherein the means for determining is configured to compare the indication to a list of access identifiers to determine service provided by the second node.

93. The apparatus of claim 83, wherein accessing the second node comprises registering with the second node based on a determination that the second node accepts registration requests from nodes that are not authorized for data access.

94. The apparatus of claim 83, wherein the second node comprises a femto node or a pico node.

95. The apparatus of claim 94, wherein the femto node or the pico node is restricted to not provide at least one of the group consisting of: signaling, data access, registration, paging, and service to at least one node.

96. A non-transitory computer readable storage medium, comprising:
codes for causing a computer to:
determine that a first node is not authorized for data access at a second node; and
access the second node for signaling based on the determination that the first node is not authorized for data access.

97. The non-transitory computer readable storage medium of claim 96, wherein accessing the second node comprises sending an access request to the second node via a network node.

98. The non-transitory computer readable storage medium of claim 96, wherein accessing the second node comprises sending an access request over-the-air to the second node.

99. The non-transitory computer readable storage medium of claim 96, further comprising codes for causing the computer to establish a signaling-only link with the second node based on the determination;

the non-transitory computer-readable storage medium further comprising codes for causing the computer to communicate with another node; and the signaling-only link is established as a result of the communication.

100. The non-transitory computer readable storage medium of claim 96, wherein accessing the second node comprises transmitting the signaling over-the-air to the second node.

101. The non-transitory computer readable storage medium of claim 100, wherein:

the transmitted signaling is destined for the second node; and the transmitted signaling comprises at least one of the group consisting of: interference management information, quality of service information, and loading information.

102. The non-transitory computer readable storage medium of claim 100, wherein:

the transmitted signaling is destined for a mobility manager; and the transmitted signaling comprises at least one of the group consisting of: registration information, service request information, quality of service configuration information, and authentication information.

103. The non-transitory computer readable storage medium of claim 100, wherein:

the second node comprises a base station;

the transmitted signaling is destined for another base station; and the transmitted signaling comprises at least one of the group consisting of: registration information, service request information, quality of service configuration information, authentication information, reservation of resources information, handoff request information, and interference management information.

104. The non-transitory computer readable storage medium of claim 96, wherein the non-transitory computer-readable storage medium further comprises codes for causing the computer to receive an indication from the second node over-the-air indicating that the second node is restricted to not provide at least one of the group consisting of: signaling, data access, registration, paging, and service to at least one node.

105. The non-transitory computer readable storage medium of claim 104, wherein the non-transitory computer-readable storage medium further comprises codes for causing the computer to compare the indication to a list of access identifiers to determine service provided by the second node.

106. The non-transitory computer readable storage medium of claim 96, wherein accessing the second node comprises registering with the second node based on a determination that the second node accepts registration requests from nodes that are not authorized for data access.

107. The non-transitory computer readable storage medium of claim 96, wherein the second node comprises a femto node or a pico node.

108. The non-transitory computer readable storage medium of claim 107, wherein the femto node or the pico node is restricted to not provide at least one of the group consisting of: signaling, data access, registration, paging, and service to at least one node.

* * * * *